(12) United States Patent
Kutthumolu et al.

(10) Patent No.: US 12,153,486 B2
(45) Date of Patent: Nov. 26, 2024

(54) INTELLIGENT EXCEPTION HANDLING SYSTEM WITHIN A DISTRIBUTED NETWORK ARCHITECTURE

(71) Applicant: BANK OF AMERICA CORPORATION, Charlotte, NC (US)

(72) Inventors: Durga Prasad Kutthumolu, Telangana (IN); Saravana Kumar Pd, Telangana (IN); Ramaswamy M, Tamilnadu (IN); Sakshi Bakshi, New Delhi (IN); Sreekanth Raghuveer Maringanti, Sanath Nagar (IN); Ramakanth Bachu, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/990,967

(22) Filed: Nov. 21, 2022

(65) Prior Publication Data

US 2024/0168838 A1 May 23, 2024

(51) Int. Cl.
G06F 11/07 (2006.01)

(52) U.S. Cl.
CPC ...... *G06F 11/0772* (2013.01); *G06F 11/0709* (2013.01); *G06F 11/0781* (2013.01); *G06F 11/0784* (2013.01); *G06F 11/0757* (2013.01)

(58) Field of Classification Search
CPC ............ G06F 11/0772; G06F 11/0709; G06F 11/0778; G06F 11/0781; G06F 11/0784
USPC ................. 709/220, 223, 224, 226, 228
See application file for complete search history.

(56) References Cited

U.S. PATENT DOCUMENTS

| | | | |
|---|---|---|---|
| 6,981,264 B1 | 12/2005 | Lin | |
| 7,194,744 B2 | 3/2007 | Srivastava | |
| 8,365,198 B2 | 1/2013 | Duffy | |
| 9,304,778 B2 | 4/2016 | Duffy | |
| 9,712,938 B2 * | 7/2017 | Boehm | H04S 7/30 |
| 10,687,516 B1 * | 6/2020 | Van Eeden | A01K 11/006 |
| 11,003,489 B2 | 5/2021 | Elliott | |
| 11,048,619 B2 | 6/2021 | Arbon | |
| 11,347,624 B1 | 5/2022 | Naar | |
| 11,385,948 B1 | 7/2022 | Livneh | |
| 11,442,739 B2 | 9/2022 | Liu | |
| 11,443,198 B1 | 9/2022 | Chen | |

(Continued)

FOREIGN PATENT DOCUMENTS

| | | | | |
|---|---|---|---|---|
| CN | 113744041 A | * | 12/2021 | ............. G06Q 40/03 |
| CN | 115985010 A | * | 4/2023 | |

(Continued)

*Primary Examiner* — Khanh Q Dinh
(74) *Attorney, Agent, or Firm* — Moore & Van Allen PLLC; Anup Shrinivasan Iyer

(57) ABSTRACT

Systems, computer program products, and methods are described herein for intelligent exception handling within a distributed network environment. The present disclosure is configured to receive an incidence of a first exception associated with a network interaction; extract information associated with the first exception; determine, via a machine learning (ML) subsystem, a first exception category associated with the first exception based on at least the information associated with the exception; retrieve, from a repository, a first set of actions associated with the first exception category, wherein the first set of actions are configured to resolve the first exception; and in response, execute the first set of actions.

20 Claims, 5 Drawing Sheets

(56) References Cited

U.S. PATENT DOCUMENTS

| | | | |
|---|---|---|---|
| 11,462,095 B2 * | 10/2022 | Mars | H04W 4/80 |
| 11,481,290 B2 | 10/2022 | Horsnell | |
| 11,675,651 B2 | 6/2023 | Li | |
| 11,770,305 B2 | 9/2023 | Qin | |
| 11,886,615 B2 * | 1/2024 | McFarland, Jr. | G06F 21/602 |
| 11,928,028 B2 | 3/2024 | Suryanarayana | |
| 2018/0183655 A1 * | 6/2018 | Gupta | H04W 76/38 |
| 2020/0026785 A1 * | 1/2020 | Patangia | H04L 9/0643 |
| 2020/0050595 A1 * | 2/2020 | Sun | G06F 16/2379 |
| 2020/0051936 A1 * | 2/2020 | Huang | H01L 24/05 |
| 2020/0215584 A1 * | 7/2020 | Wells, II | B60S 3/04 |
| 2020/0237223 A1 * | 7/2020 | Bedell | A61J 1/03 |
| 2020/0246550 A1 * | 8/2020 | Wallace | A61M 5/31596 |
| 2020/0272619 A1 * | 8/2020 | Alferov | H04L 9/3297 |
| 2020/0294410 A1 * | 9/2020 | DelBane | G06N 3/04 |
| 2020/0311303 A1 * | 10/2020 | Wang | G06F 21/602 |
| 2021/0124674 A1 * | 4/2021 | Mamadapur | G06N 20/20 |
| 2021/0326889 A1 * | 10/2021 | Wang | G06Q 20/3825 |
| 2022/0092464 A1 | 3/2022 | Wistuba | |
| 2023/0088431 A1 | 3/2023 | Bychkovsky | |
| 2023/0124004 A1 | 4/2023 | Jiang | |
| 2023/0205869 A1 | 6/2023 | Constable | |
| 2023/0379180 A1 * | 11/2023 | Khaykovich | H04L 9/50 |

FOREIGN PATENT DOCUMENTS

| | | | |
|---|---|---|---|
| WO | 2022179493 A1 | 9/2022 | |
| WO | 2023192263 A1 | 10/2023 | |

\* cited by examiner

INTELLIGENT EXCEPTION HANDLING SYSTEM WITHIN A DISTRIBUTED NETWORK ARCHITECTURE

TECHNOLOGICAL FIELD

Example embodiments of the present disclosure relate to exception handling systems within a distributed network architecture

BACKGROUND

Distributed ledger is a shared, replicated immutable ledger for recording transactions, tracking artifacts, and building trust. An artifact can be tangible (e.g., a house or a car) or intangible (e.g., intellectual property or patents). Distributed ledger is built on properties like consensus, provenance, immutability, finality. In a traditional network interaction with a distributed network environment, an interaction (e.g., transaction) that involves multiple entities is recorded differently by each entity. If two entities disagree on the state of an interaction, then an exception may occur, which can often be costly and time consuming to resolve.

Applicant has identified a number of deficiencies and problems associated with exception handling within a distributed network. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for intelligent exception handling within a distributed network environment.

In one aspect, a system for intelligent exception handling within a distributed network environment is presented. The system comprising: at least one non-transitory storage device; and at least one processor coupled to the at least one non-transitory storage device, wherein the at least one processor is configured to: receive an incidence of a first exception associated with a network interaction; extract information associated with the first exception; determine, via a machine learning (ML) subsystem, a first exception category associated with the first exception based on at least the information associated with the exception; retrieve, from a repository, a first set of actions associated with the first exception category, wherein the first set of actions are configured to resolve the first exception; and in response, execute the first set of actions.

In some embodiments, in determining the exception category, the processor is further configured to deploy, via the ML subsystem, a trained ML model on the information associated with the first exception; and determine, using the trained ML model, the first exception category associated with the first exception.

In some embodiments, the processor is further configured to: retrieve, from an exception handling repository, one or more exceptions, wherein the one or more exceptions are associated with one or more exception categories; extract information associated with one or more exceptions and one or more actions associated with the one or more exception categories, wherein the one or more actions were executed to resolve the one or more exceptions; generate a feature set using the information associated with the one or more exceptions, the one or more exception categories, and the one or more actions; and train, using the ML subsystem, an ML model using the feature set to generate the trained ML model.

In some embodiments, the processor is further configured to: receive, from a user input device, a request to execute the network interaction; receive, from the user input device, one or more interaction parameters associated with the network interaction; and execute the network interaction using the one or more interaction parameters.

In some embodiments, the request to execute the network interaction is received via an application layer.

In some embodiments, the application layer is associated with a virtual environment.

In some embodiments, the network interaction is associated with a transaction within a distributed network environment.

In some embodiments, the distributed network environment comprises one or more distributed databases encrypted using quantum computation and information theory.

In another aspect, a computer program product for intelligent exception handling within a distributed network environment is presented. The computer program product comprising a non-transitory computer-readable medium comprising code causing an apparatus to: receive an incidence of a first exception associated with a network interaction; extract information associated with the first exception; determine, via a machine learning (ML) subsystem, a first exception category associated with the first exception based on at least the information associated with the exception; retrieve, from a repository, a first set of actions associated with the first exception category, wherein the first set of actions are configured to resolve the first exception; and in response, execute the first set of actions.

In yet another aspect, a method for intelligent exception handling within a distributed network environment is presented. The method comprising: receiving an incidence of a first exception associated with a network interaction; extracting information associated with the first exception; determining, via a machine learning (ML) subsystem, a first exception category associated with the first exception based on at least the information associated with the exception; retrieving, from a repository, a first set of actions associated with the first exception category, wherein the first set of actions are configured to resolve the first exception; and in response, executing the first set of actions.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
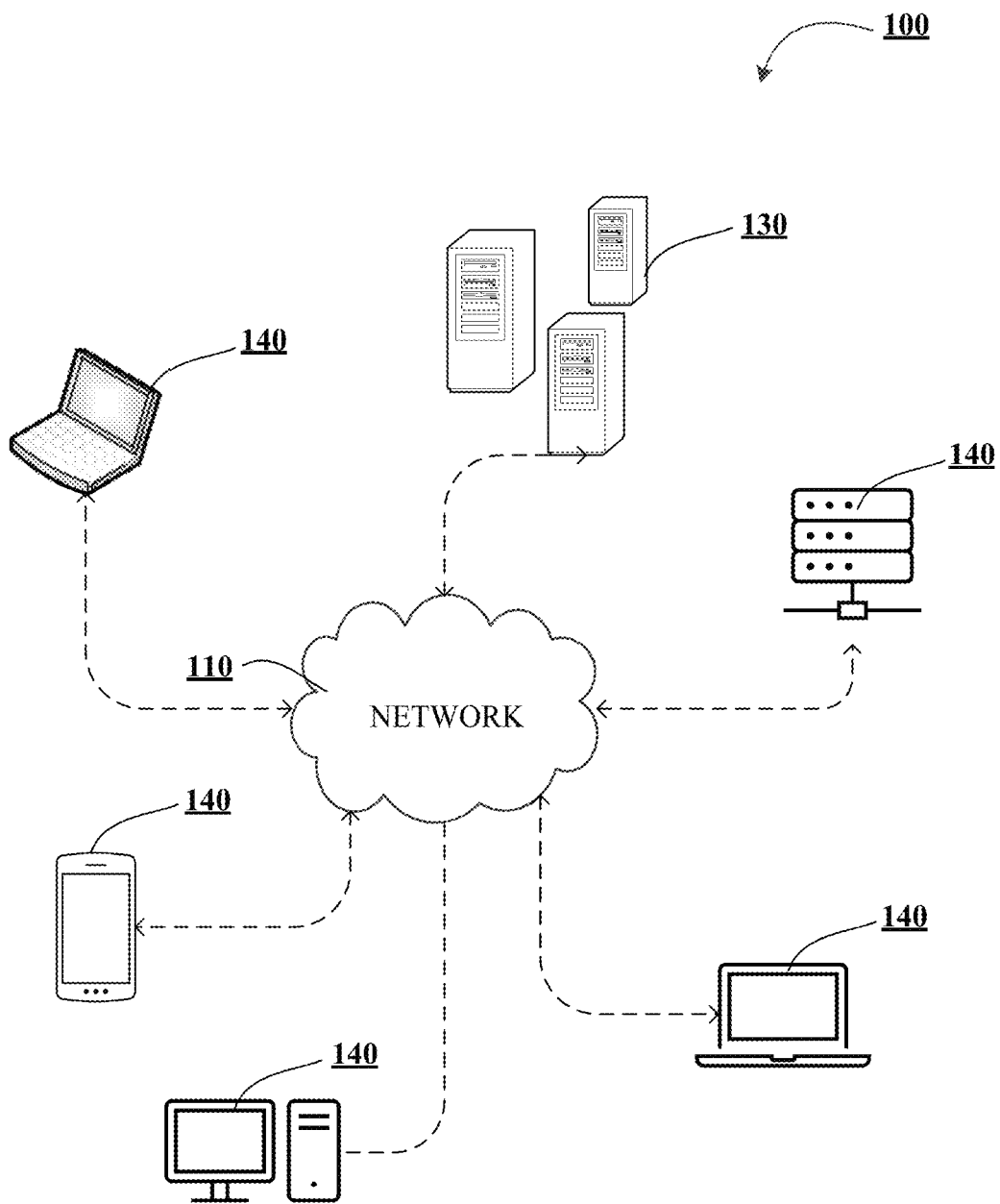
Figure 1B:
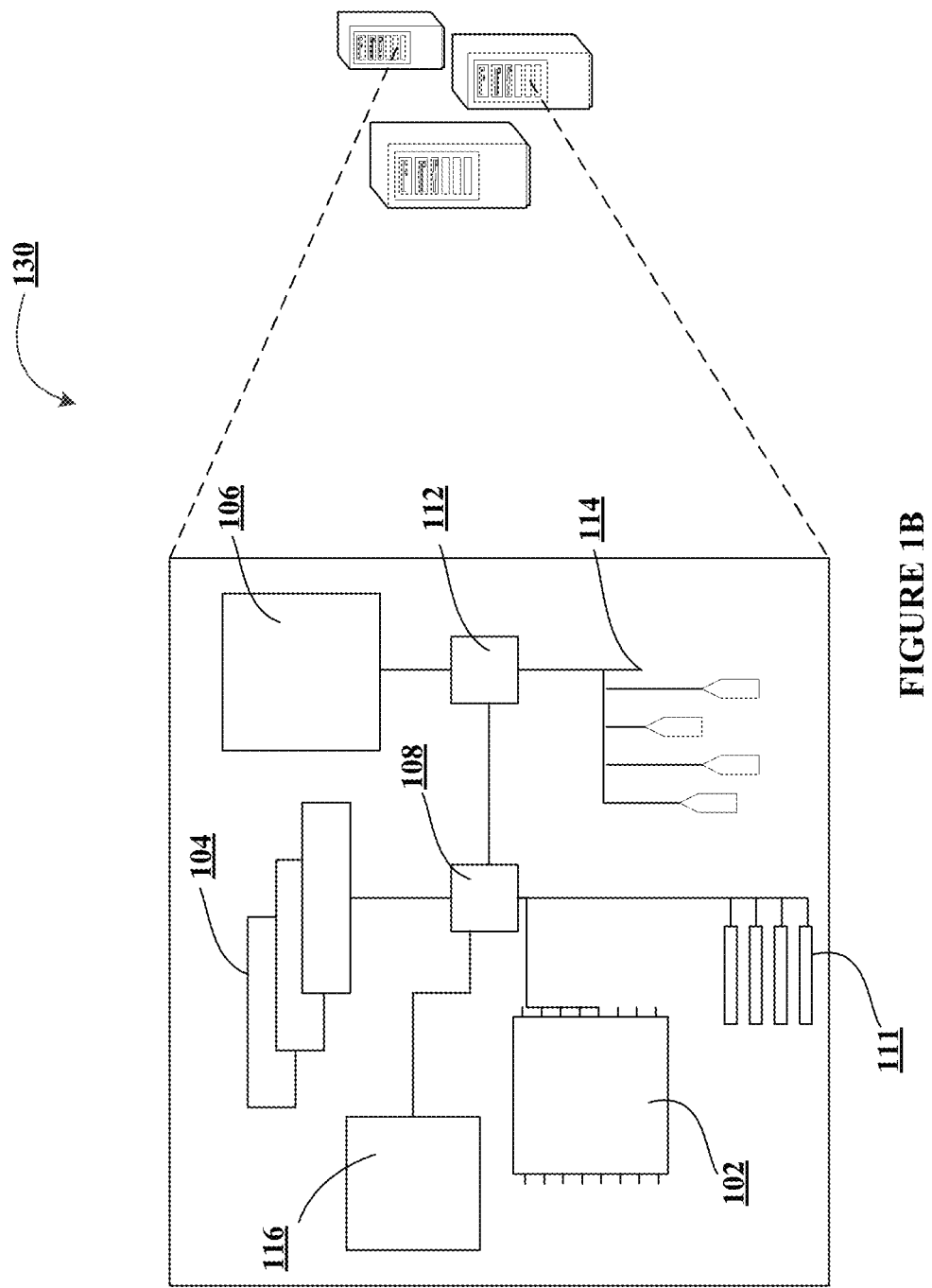
Figure 1C:
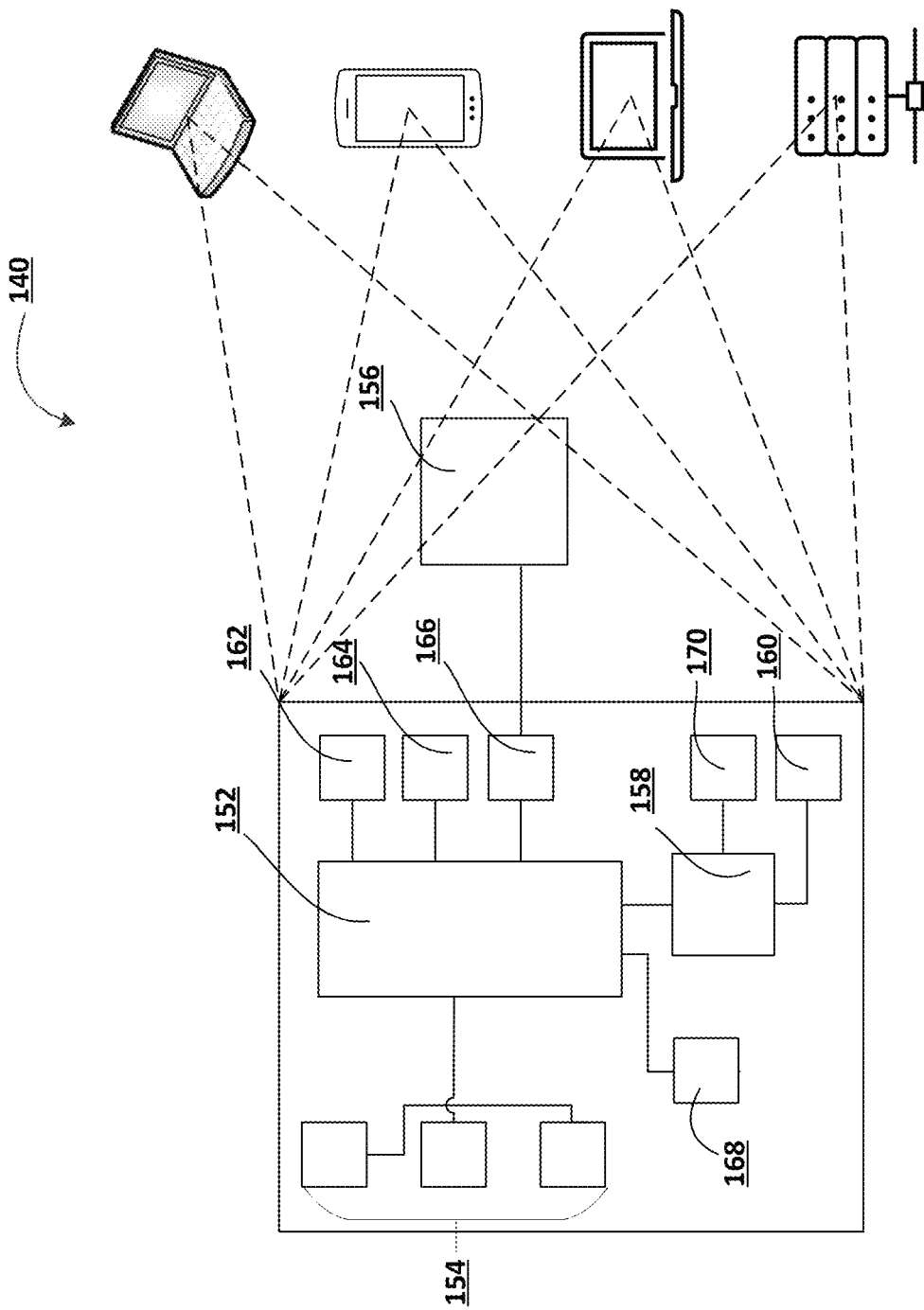
Figure 2:
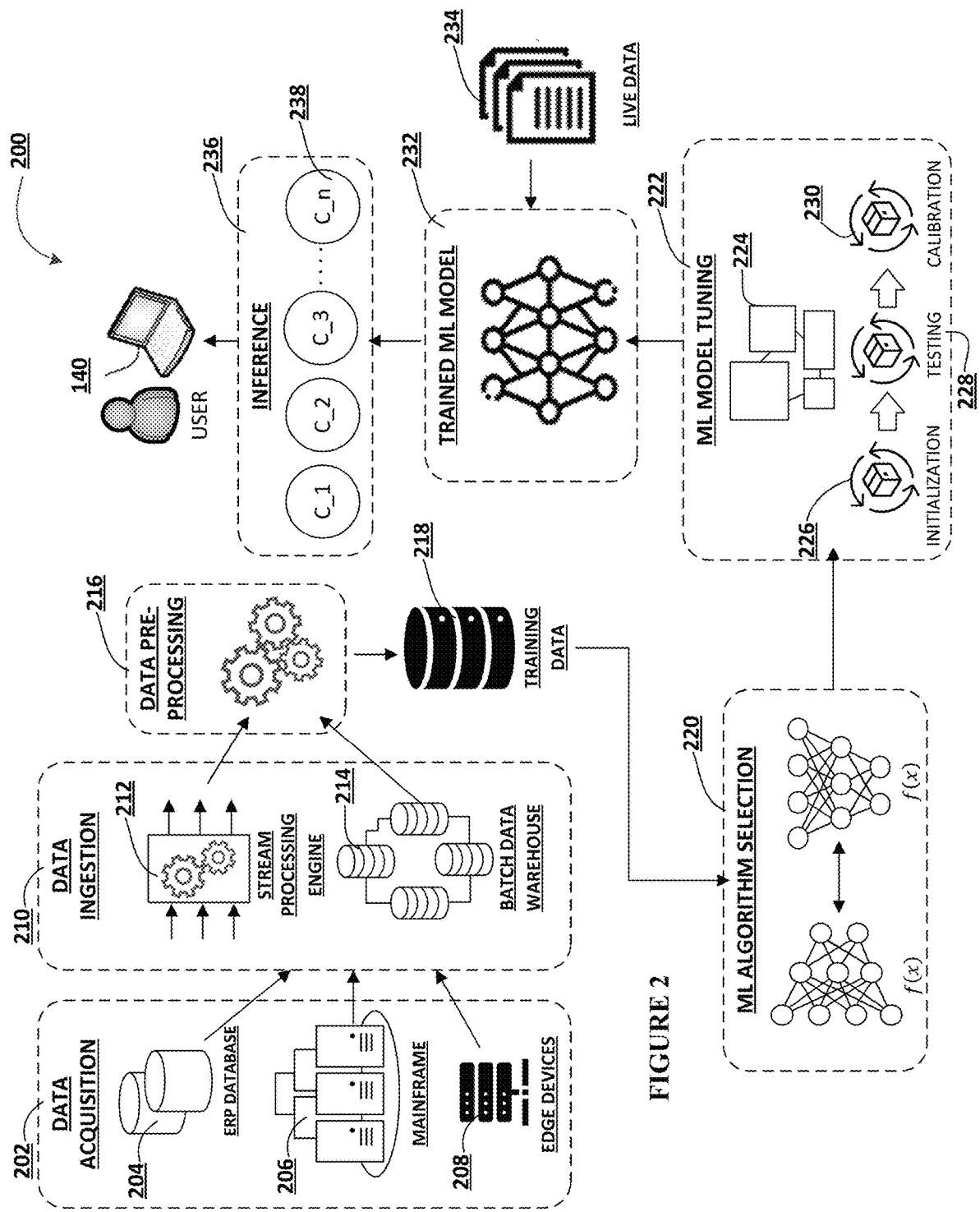

FIGS. 1A-1C illustrates technical components of an exemplary distributed computing environment for intelligent exception handling within a distributed network environment, in accordance with an embodiment of the disclosure;

FIG. 2 illustrates an exemplary machine learning (ML) subsystem architecture 200, in accordance with an embodiment of the disclosure.

Figure 3:
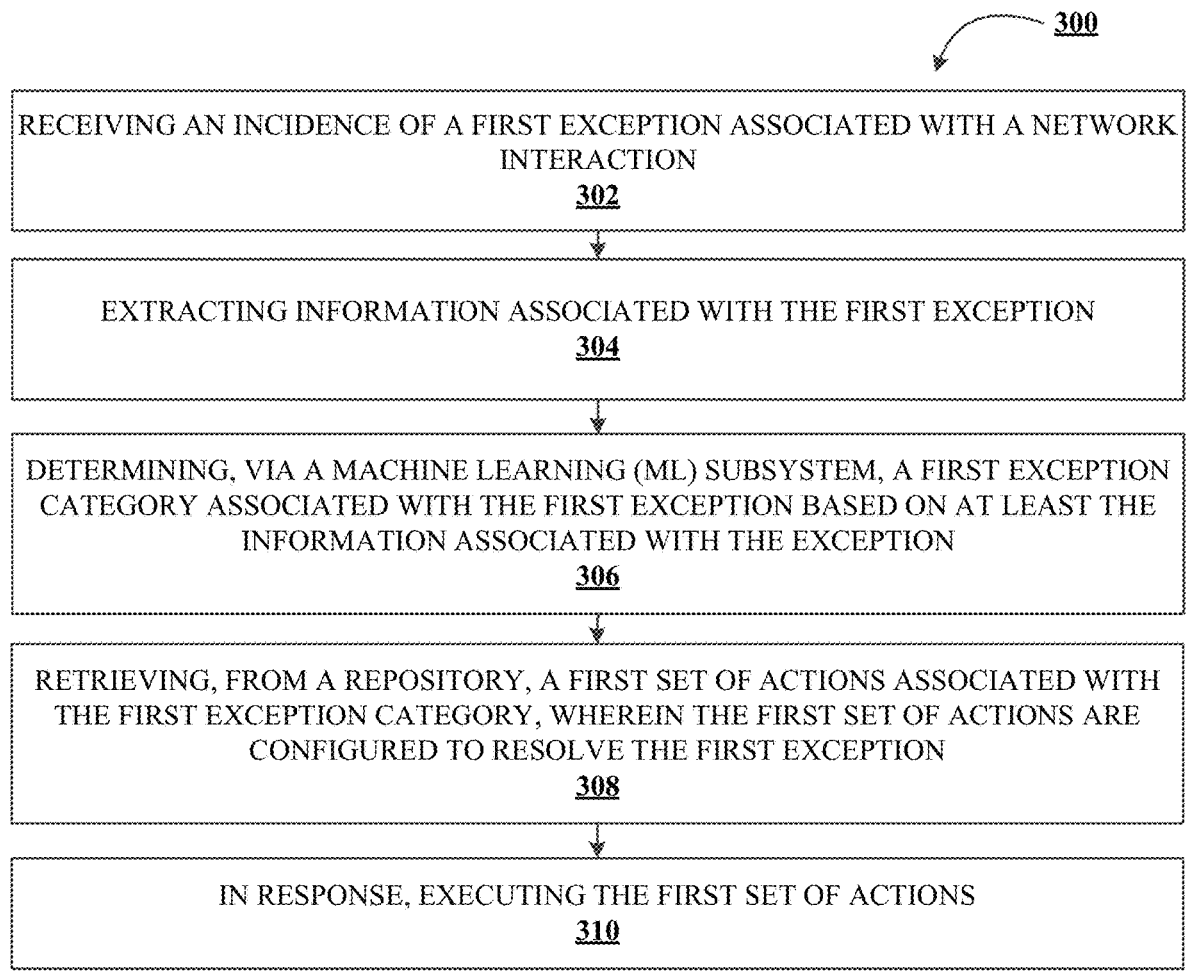

FIG. 3 illustrates method for intelligent exception handling within a distributed network environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Distributed ledger is a shared, replicated immutable ledger for recording transactions, tracking artifacts, and building trust. An artifact can be tangible (e.g., a house or a car) or intangible (e.g., intellectual property or patents). Distributed ledger is built on properties like consensus, provenance, immutability, finality. In a traditional network interaction with a distributed network environment, an interaction (e.g., transaction) that involves multiple entities is recorded differently by each entity. If two entities disagree on the state of an interaction, then an exception may occur, which can often be costly and time consuming to resolve.

Unhandled exceptions may lead to failures and potential system crashes, and they often expose an application when vulnerable. Exception handling can help to anticipate errors or systems crashes in advance and then put in appropriate code to recover from them. However, manual handling of exceptions tends to become tedious and time consuming with an increasing number of interactions being executed within the distributed network environment at any time instant. Therefore, there is a need for an intelligent exception handling system capable of automating the implementation of resolution actions. Accordingly, the present disclosure, (i) Receives an incidence of a first exception associated with a network interaction. The network interaction may be associated with a transaction to be executed within a distributed network environment using a quantum distributed database/ledger that are encrypted using quantum computation and information theory. The network interaction may be executed in an application layer. In some examples, the application layer may be associated with Web 3.0—a third generation evolution of web technologies with an emphasis on decentralized applications and distributed network environment—with an extended reality (XR) platform and virtual world access. Exception may refer to unwanted or unexpected events (e.g., runtime errors) that occur during a network interaction, (ii) Extracts information associated with the first exception. The information associated with the first exception may include metadata associated with the exception, (iii) Determines, via a machine learning (ML) subsystem, a first exception category associated with the first exception based on at least the information associated with the exception. Deploys, via the ML subsystem, a trained ML model on the information associated with the first exception. The ML model may be trained using known exceptions, an exception category for each of the known exceptions, and a set of actions associated with each exception category that are known to resolve exceptions in that category. Determines, using the trained ML model, the first exception category associated with the first exception, (iv) Retrieves, from a repository, a first set of actions associated with the first exception category, wherein the first set of actions are configured to resolve the first exception, and (v) Executes the first set of actions in response to retrieving the first set of actions.

What is more, the present disclosure removes manual input and waste from the implementation of the solution, thus improving speed and efficiency of the process and conserving computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for intelligent exception handling within a distributed network environment 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the disclosure. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features (e.g., information associated with one or more exceptions) for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels (e.g., exception categories) to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., $C\_1, C\_2 \ldots C\_n$ 238) live data 234 based on how similar they are to one another to solve exploratory challenges where little is known about the data, provide a description or label (e.g., $C\_1, C\_2 \ldots C\_n$ 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method for intelligent exception handling within a distributed network environment, in accordance with an embodiment of the disclosure. As shown in block 302, the method includes receiving an incidence of a first exception associated with a network interaction. Each network interaction session initiated by a user may be accompanied with a number of interaction parameters. The interaction parameters may define the metes and bounds of the network interaction session. In response to receiving a request from the user, the system may execute the network interaction using the interaction parameters. In some embodiments, the request to execute the network interaction may be received via an application layer. In some examples, the application layer may be associated with Web 3.0—a third generation evolution of web technologies with an emphasis on decentralized applications and distributed network environment—with an extended reality (XR) platform and virtual world access. In some examples, the network interaction may be associated with a transaction to be executed within a distributed network environment using a quantum distributed database/ledger that are encrypted using quantum computation and information theory.

In some embodiments, an exception may occur during a pendency of a network interaction session initiated by a user. An exception may refer to unwanted or unexpected events (e.g., runtime errors) that occur during a network interaction. For example, in a distributed network environment where there is a constant exchange of resources between individuals (e.g., users) in a peer-to-peer (P2P) manner, an exception may be a mismatch in the number of (type and quantity) resources exchanged, resource exchange submission timeouts, incorrect network identifiers or tags, resource extraction issues, and/or the like. In some other embodiments, an exception may refer to a hardware exception associated with the end-point device(s) involved in the network interaction. In still other embodiments, an exception may refer to a software exception, such as syntax exceptions associated with any code used to facilitate the network interaction.

Next, as shown in block 304, the method includes extracting information associated with the first exception. In some embodiments, the information associated with the first exception may include metadata associated with the exception. For example, where the exception happened, dependency effects of the exceptions, end-point device(s) affected by the exception, amount of resources in question, smart contract associated with the network interaction, application used to facilitate the network interaction, and/or the like.

Next, as shown in block 306, the method includes determining, via a machine learning (ML) subsystem, a first exception category associated with the first exception based on at least the information associated with the exception. To this end, in some embodiments, the system may deploy, via the ML subsystem, a trained ML model on the information associated with the first exception. As described herein, a trained ML model may refer to a mathematical model generated by machine learning algorithms based on training data, to make predictions or decisions without being explicitly programmed to do so. To train the ML model, the system may retrieve, from an exception handling repository, one or more exceptions (e.g., historical exceptions that occurred in the past in same or similar systems). In some embodiments, each exception may be associated with an exception category. Then, the system may extract information associated with each exception and determine specific actions executed in response to resolve each exception. In some embodiments, each exception category may be associated with a specific set of actions that are executed to resolve exceptions that can be categorized in that category. The exceptions, exception categories, and the actions associated with the exception categories may be used as training data (e.g., feature set) to train the ML model. In response, the system may determine, using the trained ML model, the first exception category associated with the first exception.

Next, as shown in block 306, the method includes retrieving, from a repository, a first set of actions associated with the first exception category, wherein the first set of actions are configured to resolve the first exception. In some embodiments, an exception may be categorized into two or more exception categories using a measure of probability or likelihood of association. For example, an exception may be categorized into a first exception category with a 49% likelihood of association and a second exception category with a 58% likelihood of association. In such cases, the set of actions may be executed to resolve the exception may include a set of actions associated with the first exception category and a set of actions associated with the second exception category.

Next, as shown in block 308, the method includes executing the first set of actions in response to retrieving the first set of actions. In some embodiments, as each action is executed, the system may determine a percentage of success associated with the action depending on how the action has contributed to the overall resolution of the exception. In examples where the first set of action is a combination actions associated with the first exception category and the second exception category, the system may determine, during execution, which of the actions contribute towards the resolution of the exception. In response, the system may update the repository with a quantifiable representation (e.g., percentage of success) associated with each action for the first exception. In this way, if a future exception is categorized in a similar way, the system may execute the actions in a descending order of percentage of success (e.g., execute the action with the highest percentage of success first, and so on).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for intelligent exception handling within a distributed network environment, the system comprising:
   a processor;
   a non-transitory storage device containing instructions that, when executed by the processor, cause the processor to:
   receive an incidence of a first exception associated with a network interaction, wherein the first exception is associated with at least one of a mismatch in a number of type of resources exchanged, a mismatch in a number of resources exchanged, a resource exchange submission timeout, an incorrect network identifier, and a resource extraction issue;
   extract information associated with the first exception, wherein the information comprises at least one of a location where the first exception occurred, dependency effects of the first exception, end-point device(s) affected by the first exception, the number of resources associated with the first exception, a smart contract associated with the network interaction, and an application used to facilitate the network interaction;
   determine, via a machine learning (ML) subsystem, a first exception category associated with the first exception based on at least the information associated with the exception;
   retrieve, from a repository, a first set of actions associated with the first exception category, wherein the first set of actions are configured to resolve the first exception; and
   in response, execute the first set of actions.

2. The system of claim 1, wherein the instructions, when executed to determine the exception category, further causes the processor to:
   deploy, via the ML subsystem, a trained ML model on the information associated with the first exception; and
   determine, using the trained ML model, the first exception category associated with the first exception.

3. The system of claim 1, wherein the instructions, when executed, further cause the processor to:
   retrieve, from an exception handling repository, one or more exceptions, wherein the one or more exceptions are associated with one or more exception categories;
   extract information associated with one or more exceptions and one or more actions associated with the one or more exception categories, wherein the one or more actions were executed to resolve the one or more exceptions;
   generate a feature set using the information associated with the one or more exceptions, the one or more exception categories, and the one or more actions; and
   train, using the ML subsystem, an ML model using the feature set to generate the trained ML model.

4. The system of claim 1, wherein the instructions, when executed, further cause the processor to:
   receive, from a user input device, a request to execute the network interaction;
   receive, from the user input device, one or more interaction parameters associated with the network interaction; and
   execute the network interaction using the one or more interaction parameters.

5. The system of claim 4, wherein the request to execute the network interaction is received via an application layer.

6. The system of claim 5, wherein the application layer is associated with a virtual environment.

7. The system of claim 4, wherein the network interaction is associated with a transaction within a distributed network environment.

8. The system of claim 7, wherein the distributed network environment comprises one or more distributed databases encrypted using quantum computation and information theory.

9. A computer program product for intelligent exception handling within a distributed network environment, the computer program product comprising a non-transitory computer-readable medium comprising code causing an apparatus to:

receive an incidence of a first exception associated with a network interaction, wherein the first exception is associated with at least one of a mismatch in the number of type of resources exchanged, a mismatch in the number of resources exchanged, a resource exchange submission timeout, an incorrect network identifier, and a resource extraction issue;

extract information associated with the first exception, wherein the information comprises at least one of a location where the first exception occurred, dependency effects of the first exception, end-point device(s) affected by the first exception, the number of resources associated with the first exception, a smart contract associated with the network interaction, and an application used to facilitate the network interaction;

determine, via a machine learning (ML) subsystem, a first exception category associated with the first exception based on at least the information associated with the exception;

retrieve, from a repository, a first set of actions associated with the first exception category, wherein the first set of actions are configured to resolve the first exception; and in response, execute the first set of actions.

10. The computer program product of claim 9, in determining the exception category, the apparatus is further configured to:

deploy, via the ML subsystem, a trained ML model on the information associated with the first exception; and determine, using the trained ML model, the first exception category associated with the first exception.

11. The computer program product of claim 9, wherein the apparatus is further configured to:

retrieve, from an exception handling repository, one or more exceptions, wherein the one or more exceptions are associated with one or more exception categories;

extract information associated with one or more exceptions and one or more actions associated with the one or more exception categories, wherein the one or more actions were executed to resolve the one or more exceptions;

generate a feature set using the information associated with the one or more exceptions, the one or more exception categories, and the one or more actions; and train, using the ML subsystem, an ML model using the feature set to generate the trained ML model.

12. The computer program product of claim 9, wherein the apparatus is further configured to:

receive, from a user input device, a request to execute the network interaction;

receive, from the user input device, one or more interaction parameters associated with the network interaction; and execute the network interaction using the one or more interaction parameters.

13. The computer program product of claim 12, wherein the request to execute the network interaction is received via an application layer.

14. The computer program product of claim 13, wherein the application layer is associated with a virtual environment.

15. The computer program product of claim 12, wherein the network interaction is associated with a transaction within a distributed network environment.

16. The computer program product of claim 15, wherein the distributed network environment comprises one or more distributed databases encrypted using quantum computation and information theory.

17. A method for intelligent exception handling within a distributed network environment, the method comprising:

receiving an incidence of a first exception associated with a network interaction, wherein the first exception is associated with at least one of a mismatch in the number of type of resources exchanged, a mismatch in the number of resources exchanged, a resource exchange submission timeout, an incorrect network identifier, and a resource extraction issue;

extracting information associated with the first exception, wherein the information comprises at least one of a location where the first exception occurred, dependency effects of the first exception, end-point device(s) affected by the first exception, the number of resources associated with the first exception, a smart contract associated with the network interaction, and an application used to facilitate the network interaction;

determining, via a machine learning (ML) subsystem, a first exception category associated with the first exception based on at least the information associated with the exception;

retrieving, from a repository, a first set of actions associated with the first exception category, wherein the first set of actions are configured to resolve the first exception; and in response, executing the first set of actions.

18. The method of claim 17, in determining the exception category, the method further comprises:

deploying, via the ML subsystem, a trained ML model on the information associated with the first exception; and determining, using the trained ML model, the first exception category associated with the first exception.

19. The method of claim 17, wherein the method further comprises:

retrieving, from an exception handling repository, one or more exceptions, wherein the one or more exceptions are associated with one or more exception categories;

extracting information associated with one or more exceptions and one or more actions associated with the one or more exception categories, wherein the one or more actions were executed to resolve the one or more exceptions;

generating a feature set using the information associated with the one or more exceptions, the one or more exception categories, and the one or more actions; and training, using the ML subsystem, an ML model using the feature set to generate the trained ML model.

20. The method of claim 17, wherein the method further comprises:

receiving, from a user input device, a request to execute the network interaction;

receiving, from the user input device, one or more interaction parameters associated with the network interaction; and executing the network interaction using the one or more interaction parameters.

* * * * *